United States Patent [19]

Barkalow et al.

[11] Patent Number: 5,139,796

[45] Date of Patent: Aug. 18, 1992

[54] TOCOPHEROL MIXTURE FOR USE AS A MINT OIL ANTIOXIDANT IN CHEWING GUM

[75] Inventors: David G. Barkalow, Woodridge; Michael J. Greenberg, Northbrook; Gordon N. McGrew, Evanston, all of Ill.

[73] Assignee: Wm. Wrigley Jr. Company, Chicago, Ill.

[21] Appl. No.: 722,692

[22] Filed: Jun. 28, 1991

[51] Int. Cl.$^5$ .............................................. A23G 3/30
[52] U.S. Cl. ........................................ 426/3; 426/72; 426/541
[58] Field of Search ............................ 426/3-6, 426/451, 650, 651

[56] References Cited

U.S. PATENT DOCUMENTS

| | | | |
|---|---|---|---|
| 4,001,438 | 6/1977 | Marmo et al. | 426/96 |
| 4,101,559 | 7/1978 | McFadden et al. | 260/347.3 |
| 4,107,177 | 8/1978 | McFadden et al. | 260/332.3 |
| 4,107,321 | 8/1978 | McFadden et al. | 424/274 |
| 4,489,099 | 12/1984 | Shaheen et al. | 426/3 |
| 4,504,499 | 3/1985 | Finnan | 426/250 |
| 4,714,612 | 12/1987 | Nakamura et al. | 424/85 |
| 4,765,927 | 8/1988 | Nomura et al. | 253/400.2 |
| 4,948,595 | 8/1990 | Patel et al. | 426/3 |
| 4,977,282 | 12/1990 | Baldwin et al. | 549/412 |

OTHER PUBLICATIONS

Article, "Food Processing 1989 Awards", Food Processing Magazine, Jul. 1989.
Akzo Technical Bulletin, Akzo Salt, Inc., TB 1570, Sep. 1989.
Akzo Product Information brochure, Akzo Salt, Inc., PI 1590, PI 1580, PI 1560, Oct. 1987.
Article, "Antioxidants: Past, Present, Future", Food Processing Magazine, May 1990.
Article, "Natural Tocopherols Provide Antioxidant Protection to Meats", Food Processing Magazine, Apr. 1988.
Brochure, "Eastman Tenox GT-1 and Tenox GT-2", Eastman Kodak Co., May 1991.

*Primary Examiner*—Jeanette Hunter
*Attorney, Agent, or Firm*—Willian Brinks Olds Hofer Gilson & Lione

[57] ABSTRACT

Specific mixtures of tocopherol homologs exhibit surprisingly improved antioxidant effects in mint oil and mint-flavored chewing gum compositions. The mixtures of homologs fall within the range of 7-15% by weight alpha tocopherol, 45-70% by weight gamma tocopherol and 20-35% by weight delta tocopherol. Homologue mixtures within this range are superior to the constituent homologs used alone, and to other homologue mixtures, in terms of antioxidant effects. The compositions of the invention facilitate the replacement of controversial synthetic antioxidants currently used in mint oil and mint-flavored chewing gum, with naturally occurring tocopherols.

11 Claims, 3 Drawing Sheets

TOCOPHEROL MIXTURE FOR USE AS A MINT OIL ANTIOXIDANT IN CHEWING GUM

FIELD OF THE INVENTION

The present invention relates to mint oil and mint flavored chewing gum compositions containing a specific blend of tocopherol homologs which provides improved antioxidant effects.

BACKGROUND OF THE INVENTION

As is known in the art, chewing gum compositions include a number of ingredients, some of which are subject to deterioration through oxidation during storage. Mint oils are important ingredients of chewing gum which require stabilization, both before and after the mint oils are incorporated into the chewing gum. The term "mint oil" as used herein includes, but is not limited to, peppermint oil, spearmint oil, corn mint oil and Scotch spearmint oil. The use of peppermint oil in chewing gum, enhanced with a minor amount of spearmint oil, is discussed in U.S. Pat. No. 4,948,595 issued to Patel et al.

Several synthetic antioxidants are in widespread use for stabilizing mint oil and mint flavored chewing gum compositions. Among the most notable of these synthetic antioxidants are Butylated Hydroxy. anisole (BHA), Butylated Hydroxytoluene (BHT) and tertiary butyl hydroquinone (TBHQ). While BHA, BHT and TBHQ are effective in preventing and reducing oxidation of mint oil and mint flavored chewing gum compositions, these compounds have been found to be carcinogenic in animal testing.

Tocopherols are naturally occurring compounds which are known to have antioxidant properties. The most common tocopherol, alpha-tocopherol, is also known as vitamin E. The other common homologs are beta, gamma and delta tocopherols. All of these tocopherol homologs are FDA approved additives which have been shown to be safe in animal testing. Natural tocopherols are usually derived from vegetable oils, especially soybean oil. Tocopherols can also be found in many spices, fruits, nuts, seeds and other plant sources.

Unfortunately, tocopherols have been found to be generally less effective than BHA and BHT in preventing oxidation of mint oil and mint flavored chewing gum. Tocopherols also have upper usage level limits, above which oxidation of the mint oil will start to increase again. Tocopherols have been used successfully as chewing gum stabilizers when added in combination with certain synthetic stabilizers. U.S. Pat. No. 4,489,099 issued to Shaheen et al. discloses the use of vitamin E tocopherol in combination with dilauryl thiodipropionate (DLTDP). However, it has previously been less effective to use tocopherols in mint oil, or in mint flavored (or other) chewing gum compositions, by themselves.

SUMMARY OF THE INVENTION

It has been discovered that certain mixtures of tocopherol homologs, in certain ratios, exhibit surprising and unexpected improvement in antioxidant properties when used in mint oil and mint flavored chewing gum compositions. The homologue mixtures useful in the invention are more effective at preventing oxidation of mint oil than any of the constituent homologs used alone. The tocopherol mixtures useful in the present invention will contain at least three tocopherol homologs, alpha, gamma and delta, in specific ratios. Beta tocopherol and possibly other homologs may also be present in small quantities.

Expressed as percentage ranges of active ingredients (i.e. weight percentages based on total tocopherols) the preferred ranges are 7-15% alpha tocopherol, 45-70% gamma tocopherol and 20-35% delta tocopherol. The most preferred ranges are 9-13% alpha tocopherol, 55-63% gamma tocopherol and 27-32% delta tocopherol. The tocopherol mixtures used in the present invention may be naturally occurring products, mixtures of naturally occurring products, modifications of natural products, mixtures of component tocopherols or natural products with added component tocopherols.

Normally, the tocopherol mixture will be present in a diluent, most commonly a vegetable oil. The amount of the diluent is not important from an antioxidant standpoint. However, active levels of about 70% (reflecting about 70% by weight tocopherol and about 30% by weight diluent) are preferred for viscosity and handling reasons.

With the foregoing in mind, it is a feature and advantage of the invention to provide a stabilizer minimizes the oxidation of the mint oils without the use of controversial synthetic antioxidants such as BHA and BHT.

It is also a feature and advantage of the invention to provide mint oil compositions for use in chewing gum, especially peppermint oil compositions, which are shelf stable and which do not contain controversial synthetic antioxidants.

It is also a feature and advantage of the invention to provide chewing gum compositions containing mint oil, which are stable and completely safe for human use, and which avoid the use of controversial BHA and BHT antioxidants.

These and other features and advantages of the invention will become apparent from the following description which, when read in conjunction with the accompanying examples and drawings, disclose presently preferred exemplary embodiments of the present Intention.. It should be understood that this description is illustrative rather than limiting, the scope of the invention being defined by the appended claims and equivalents thereof.

BRIEF DESCRIPTION OF THE DRAWINGS

FIG. 2 reflects the test results of Examples 1, 5, 6, 7 and 9 hereinafter.

FIG. 3 reflects the experimental results from Examples 1, 5 and 8.

DETAILED DESCRIPTION OF THE PRESENTLY PREFERRED EMBODIMENTS

Figure 1:
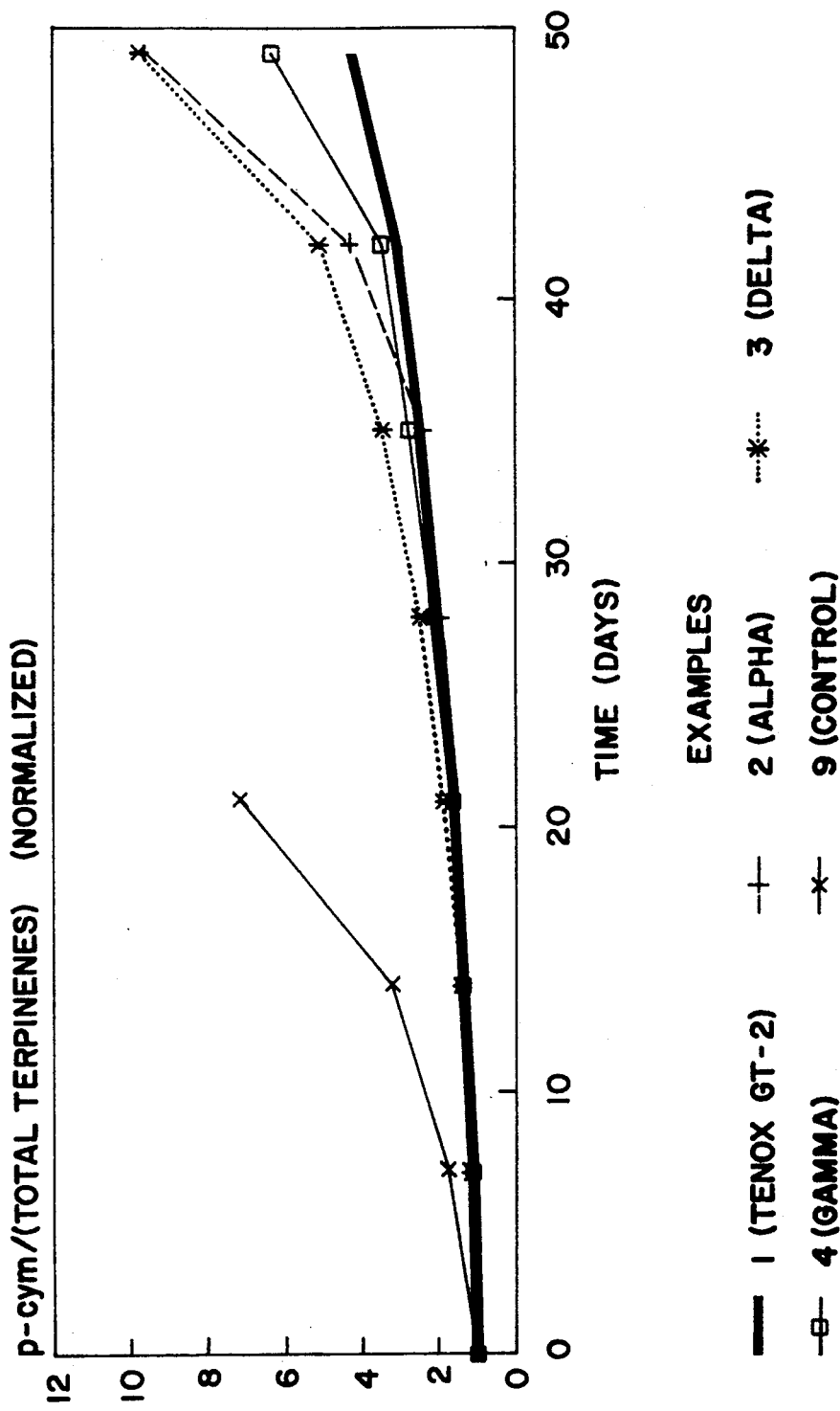
FIG. 1 shows oxidation as a function of time for peppermint oil samples which have been stabilized with Tenox GT-2, with substantially pure alpha, beta and delta tocopherols, and for an unstabilized peppermint oil sample. Tenox GT-2 is a commercially available tocopherol blend containing 10.2% alpha tocopherol, 61.6% gamma tocopherol, and 28.2% delta tocopherol (based on total tocopherols) in a soybean oil diluent (70% tocopherol mixture, 30% soybean oil). The experimental conditions are provided in Examples 1, 2, 3, 4, and 9 hereinafter.

Oxidation causes undesirable alterations of flavor of mint oil and chewing gum compositions containing mint oil. It has always been a major objective of chewing gum manufacturers to maintain the quality of the flavor and prolong the shelf life of chewing gum, including mint-flavored chewing gum. Therefore, the oxidation of mint oil, and its adverse impact on flavor, is a central concern of chewing gum manufacturers.

Mint oils, and most particularly peppermint oil, contain several key components which readily oxidize. The following Table 1 is a list of peppermint oil components and percentages, and half lives in peppermint oil, in days, at 85° F. and 100 psi oxygen.

TABLE 1

Composition Of Peppermint Oil And Half Lives of Peppermint Oil Ingredients

| Component | Percentage In Peppermint Oil* | Oxidation Half Life (Days, 85° F., 100 psi Oxygen)** |
| --- | --- | --- |
| alpha-pinene | 1.4 | 96.4 |
| beta-pinene | 1.8 | |
| sabinene | .8 | |
| myrcene | .3 | 111.0 |
| alpha-terpinene | .4 | 16.5 |
| limonene | 2.5 | 103.4 |
| 1,8-cineole | 7.3 | |
| cis-ocimene | .4 | 25.8 |
| gamma-terpinene | .4 | 19.5 |
| trans-ocimene | .1 | 25.9 |
| p-cymene | .1 | |
| terpinolene | .1 | |
| 3-octanol | .3 | 34.7 |
| 1-octene-3-ol | .1 | 115.9 |
| trans-sabinene hydrate | 1.0 | |
| menthone | 18.7 | |
| menthofuran | 3.0 | 36.3 |
| isomenthone | 2.5 | |
| linalool | .3 | |
| cis-sabinene hydrate | .1 | |
| beta-bourbonene | .5 | |
| menthyl acetate | 3.6 | |
| neomenthol | 3.1 | |
| beta-caryophyllene | .5 | 34.1 |
| neoisomenthyl acetate | .1 | |
| neoisomenthol | .4 | |
| menthol | 40.0 | |
| pulegone | .8 | |
| alpha-terpineol | .1 | |
| germacrene D | 1.3 | 24.4 |
| piperitone | .3 | |
| viridiflorol | .2 | |

*Source: Perfumer & Flavorist, Vol. 14, November/December 1989, p. 21, article entitled "Peppermint Oil Differentiation" by Shu and Harris.
**Data taken for twelve selected components.

Other mint oils also contain many of the oxidizable components that are present in peppermint oil. For instance, spearmint oil and Scotch spearmint oil contain alpha-pinene, limonene, 3-octanol and beta pinene along with other components. Corn mint oil contains alpha-pinene, myrcene, limonene, gamma-terpinene, 3-octanol, menthofuran, beta-caryophyllene, germacrene D, and beta-pinene along with other components. Therefore, an antioxidant which stabilizes peppermint oil will generally be useful for stabilizing other mint oils as well.

Previously synthetic antioxidants BHA, BHT and TBHQ have been primarily used for stabilizing peppermint oil and other mint-flavored oils. The common feature that renders these compounds effective as antioxidants is their phenolic-based structure, as shown below:

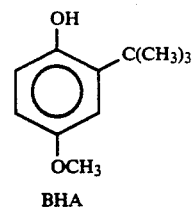
BHA

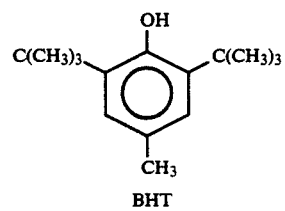
BHT

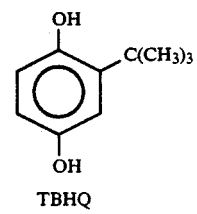
TBHQ

Tocopherols are natural substances found in vegetable and other plant seeds such a soybeans, sunflower seeds, and various fruits and nuts. The fact that tocopherols are naturally derived makes them more attractive to chewing gum manufacturers and consumers, than synthetic antioxidants. From an antioxidant standpoint, tocopherols are of interest because they contain phenolic-type groups similar to those found in BHA, BHT and TBHQ:

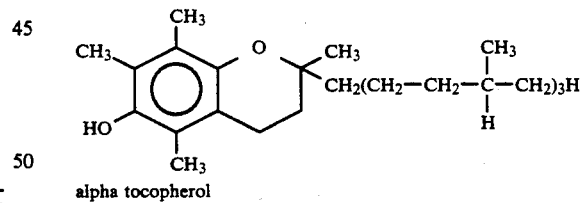
alpha tocopherol

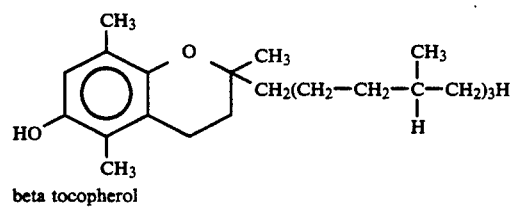
beta tocopherol

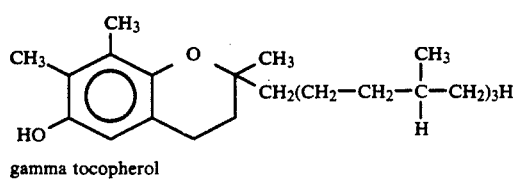
gamma tocopherol

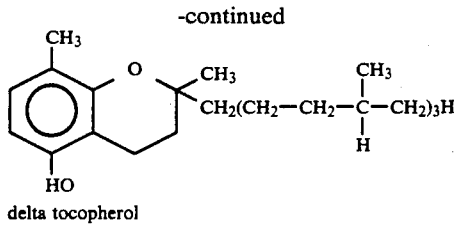

delta tocopherol

When taken individually, the different tocopherol homologs are known to exhibit different levels of chemical activity, including different levels of antioxidant activity. For this reason, processes have been developed for isolating the individual homologs from mixtures, and for converting tocopherols from one homologue to another. Such processes are discussed in U.S. Pat. No. 4,977,282 issued to Baldwin et al.

Prior to the current invention, however, it was not known that specific blends of tocopherol homologs exhibit levels of antioxidant activity in mint oil which are higher than each of the homologs taken individually. Most importantly, it was not previously known that specific mixtures of tocopherol homologs could be used successfully as antioxidants in applications where individual homologs had not proven effective, namely, mint oil and mint flavored chewing gum applications.

As previously stated, the present invention relates to the use of tocopherol mixtures which effect improved antioxidant activity in mint oil and chewing gum which contains mint oil. The preferred amounts of tocopherol mixture may vary depending on the specific mint oil and/or the specific chewing gum composition. Generally, the preferred amounts of tocopherol are higher when the mint oil is to be used in chewing gum. This is because some of the antioxidant may migrate from the mint oil into the gum base.

The following Table 2 summarizes both the preferred composition of the tocopherol mixture of the invention, and the preferred amounts which are to be used in mint oil and mint-flavored chewing gum.

TABLE 2

Tocopherol Composition And Amounts Used

| | (A) Tocopherol Composition (% by weight, based on total tocopherols) | (B) Amount Used in Mint Oil (% by weight tocopherols in mint oil) | (C) Amount Used In Mint Oil To Be Used In Chewing Gum (% by weight tocopherols based on mint oil weight) |
|---|---|---|---|
| Preferred Range | 7–15% alpha tocopherol 45–70% gamma tocopherol 20–35% delta tocopherol | .05–.50% total tocopherols | Up to 3% but may vary considerably |
| Most Preferred Range | 9–13% alpha tocopherol 55–63% gamma tocopherol 27–32% delta tocopherol | .07–.18% total tocopherols | Up to 2% |

Column B in Table 2 reflects the amount of tocopherol which is necessary to stabilize unused mint oil, such as for storage of the mint oil. Column C indicates that the antioxidant level may have to be increased before or when the mint oil is mixed with the other chewing gum components. The amount of mint oil typically used in mint flavored chewing gum varies from about 0.5–3% based on the weight of the chewing gum product, and is most typically about 1%. The amount of tocopherol required to stabilize the mint oil in the chewing gum will vary depending on the amount and type of mint oil and other chewing gum components. Therefore, the antioxidant amounts in column C can only be stated generally, and should be optimized individually for individual chewing gums.

When the mint oil is to be used in chewing gum, it is preferred that the tocopherol mixture be preblended with the mint oil. However, the tocopherol mixture may alternatively be mixed into the chewing gum along with the mint oil. In either case, the tocopherol should be thoroughly blended with the product to produce a homogeneous mixture.

In general, a chewing gum composition includes a water soluble bulk portion, a water in. soluble chewing gum base portion and typically water insoluble flavoring agents. The water soluble portion dissipates with a portion of the flavoring agents over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. Preferably, the waxes have a melting point between 95° F. and 240° F.

The gum base typically also includes a filler component such as calcium carbonate, magnesium carbonate, talc, dicalcium phosphate and the like; elastomers, including glycerol monostearate and glycerol triacetate; and optional ingredients such as antioxidants, colors and emulsifiers. The gum base constitutes between 5–95% by weight of the chewing gum composition, more typically 10–50% by weight of the chewing gum, and most commonly 25–35% by weight of the chewing gum.

The water soluble portion of the chewing gum may include softeners, bulk sweeteners, high intensity sweeteners and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. The softeners may also include aqueous sweetener solutions such as those containing sorbitol, hydrogenated starch hydrolysates, corn syrup and combinations thereof.

Bulk sweeteners constitute between 20–80% by weight of the chewing gum and may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present. These may include but are not limited to sucralose, aspartame, salts of acesulfame, alitame, saccharin and its salts, cyclamic acid and its salts, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

One or more flavoring agents are generally present in the chewing gum in an amount within the range of about 0.1-10% by weight of the chewing gum, preferably between about 0.5-3% by weight of the chewing gum. The flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorally acceptable fashion.

Optional ingredients such as colors, emulsifiers and pharmaceutical agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. The flavoring agent is typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

250 grams of peppermint oil was placed in a one pint glass jar. 0.25 grams of Kodak Tenox GT-2 (70% tocopherol mixture in 30% soybean oil) was added and mixed thoroughly to give an active tocopherol level of 0.07%. The glass jar containing the sample was placed in a Parr bomb reactor. The Parr bomb reactor was pressurized to 100 psi with oxygen and placed in an 85° F. oven.

The lot of Kodak Tenox GT-2 used contained 10.3% alpha tocopherol, 61.4% gamma tocopherol and 28.3% delta tocopherol, based on total tocopherol weight, and contained 68.4% total active tocopherol and 31.6% diluent. Tenox GT-2 is useful in the present invention. Eight other samples were prepared for comparison with Example 1, as discussed below. In each of Examples 2-8, a different tocopherol or tocopherol mixture was substituted for Tenox GT-2. The amount of tocopherol added to the 250 grams of peppermint oil corresponded, in each case, to an active tocopherol level of approximately 0.07% in the peppermint oil. Example 9, a control sample, did not contain tocopherol.

The tocopherols used in the remaining Examples, and the amounts added to peppermint oil, were as follows.

EXAMPLE 2

0.175 grams of Sigma Chemical Co. T-3251 was added to 250 grams of peppermint oil in a one pint glass jar. T-3251 contains virtually 100% alpha tocopherol and no diluent. The glass jar containing the sample was placed in a Parr bomb reactor. The reactor was placed under the same pressure and temperature conditions as used for Example 1.

EXAMPLE 3

0.175 grams of Sigma Chemical Co. T-2028 was added to 250 grams of peppermint oil in a one pint glass jar. T-2028 contains 83.3% delta tocopherol and 16.7% other tocopherols, mostly gamma tocopherol, with no diluent. The glass jar containing the sample was placed in a Parr bomb reactor. The reactor was placed under the same pressure and temperature conditions as used for Example 1.

EXAMPLE 4

0.175 grams of Kodak 1187962 was added to 250 grams of peppermint oil in a one pine glass jar. Kodak 1187962 contains 99.6% gamma tocopherol and 0.4% other tocopherols, with no diluent. The glass jar containing the sample was placed in a Parr bomb reactor. The reactor was placed under the same pressure and temperature conditions as used for Example 1.

EXAMPLE 5

0.344 grams of Vitamin E 4-50 from Kodak was added to 250 grams of peppermint oil in a one pint glass jar. Vitamin E 4-50 contains 52.9% alpha tocopherol, 11.8% delta tocopherol and 35.3% gamma tocopherol in a vegetable oil diluent, the mixture containing 50.7% total active tocopherol and 49.3% diluent. The glass jar containing the sample was placed in a Parr bomb reactor. The reactor was placed under the same pressure and temperature conditions as used for Example 1.

EXAMPLE 6

0.260 grams of Vitamin E 4-80 from Kodak was added to 250 grams of peppermint oil in a one pint glass jar. Vitamin E 4-80 contains 83.0% alpha tocopherol, 0.8% delta tocopherol and 16.2% gamma tocopherol in a vegetable oil diluent, the mixture containing 71.7% total active tocopherol and 28.3% diluent. The glass jar containing the sample was placed in a Parr bomb reactor. The reactor was placed under the same pressure and temperature conditions as used for Example 1.

EXAMPLE 7

0.418 grams of Vitamin E 5-40 from Kodak was added to 250 grams of peppermint oil in a one pint glass jar. Vitamin E 5-40 contains 99.1% alpha tocopherol and 0.9% gamma tocopherol in a vegetable oil diluent, the mixture containing 43.6% total active tocopherol and 56.4% diluent. The glass jar containing the sample was placed in a Parr bomb reactor. The reactor was placed under the same pressure and temperature conditions as used for Example 1.

EXAMPLE 8

0.25 grams of Covi-ox T-70 from Henkel was added to 250 grams of peppermint oil in a one pint glass jar. Covi-ox T-70 is useful in the present invention and, according to the manufacturer, contains 12% alpha tocopherol, 2% beta tocopherol, 30% delta tocopherol and 56% gamma tocopherol in a vegetable oil diluent, the mixture containing 70% total active tocopherol and 30% diluent. The glass jar containing the sample was placed in a Parr bomb reactor. The reactor was placed under the same pressure and temperature conditions as used for Example 1.

EXAMPLE 9

250 grams of peppermint oil was placed in a one pint glass jar for use as a Parr bomb control. No tocopherol was added. The glass jar containing the sample was placed in a Parr bomb reactor. The reactor was placed under the same pressure and temperature conditions as used for Example 1. A second control sample was placed in a one gallon amber glass jug with a polyethylene lined cap and stored in a refrigerator to serve as a reference standard to normalize results.

ANALYSIS AND RESULTS OF EXPERIMENTS

The Parr bomb reactors of Examples 1-9 were maintained at 100 psi oxygen and stored in the 85° F. oven for 50 days. Samples were removed for analysis at 0, 7, 14, 21, 28, 35, 42 and 49 days. The samples were analyzed using Gas Chromatography for para-cymene, alpha-terpinene and gamma-terpinene. The terpinenes are oxidizable components which are depleted over time. Para-cymene is the oxidation product of the two terpinenes which increases in concentration as oxidation proceeds.

The results were calculated as an oxidation ratio of products over reactants normalized to the refrigerated control:

$$\text{Oxidation ratio (after } x \text{ days)} = \frac{\text{paracymene }(Tx)/\text{total terpinenes }(Tx)}{\text{paracymene }(To)/\text{total terpinenes }(To)}$$

where Tx represents concentrations after x days, in the Parr bomb samples, and

To represents concentrations in the refrigerated reference standard, measured at the same times as the Parr bomb samples.

The ratio would be 1/1 for an unoxidized Parr bomb sample with higher ratios occurring as the samples oxidize. The results are shown graphically in FIGS. 1-3.

FIG. 1 compares the Tenox GT-2 samples useful in the invention (Example 1) with the three constituent tocopherol homologs (Examples 2-4), and with the unprotected Parr bomb control (Example 9). The Parr bomb control oxidized very quickly and all of the tocopherol samples (Examples 1-4) showed significant antioxidant effect. However, the tocopherol mixture useful in the invention (Example 1) exhibited significantly greater antioxidant activity than each of the constituent homologs (Examples 2-4), especially at longer time periods. FIG. 1 clearly illustrates the existence of a surprising and beneficial synergistic relationship between the three homologs, when the homologs are mixed in concentrations according to the invention.

Figure 2:
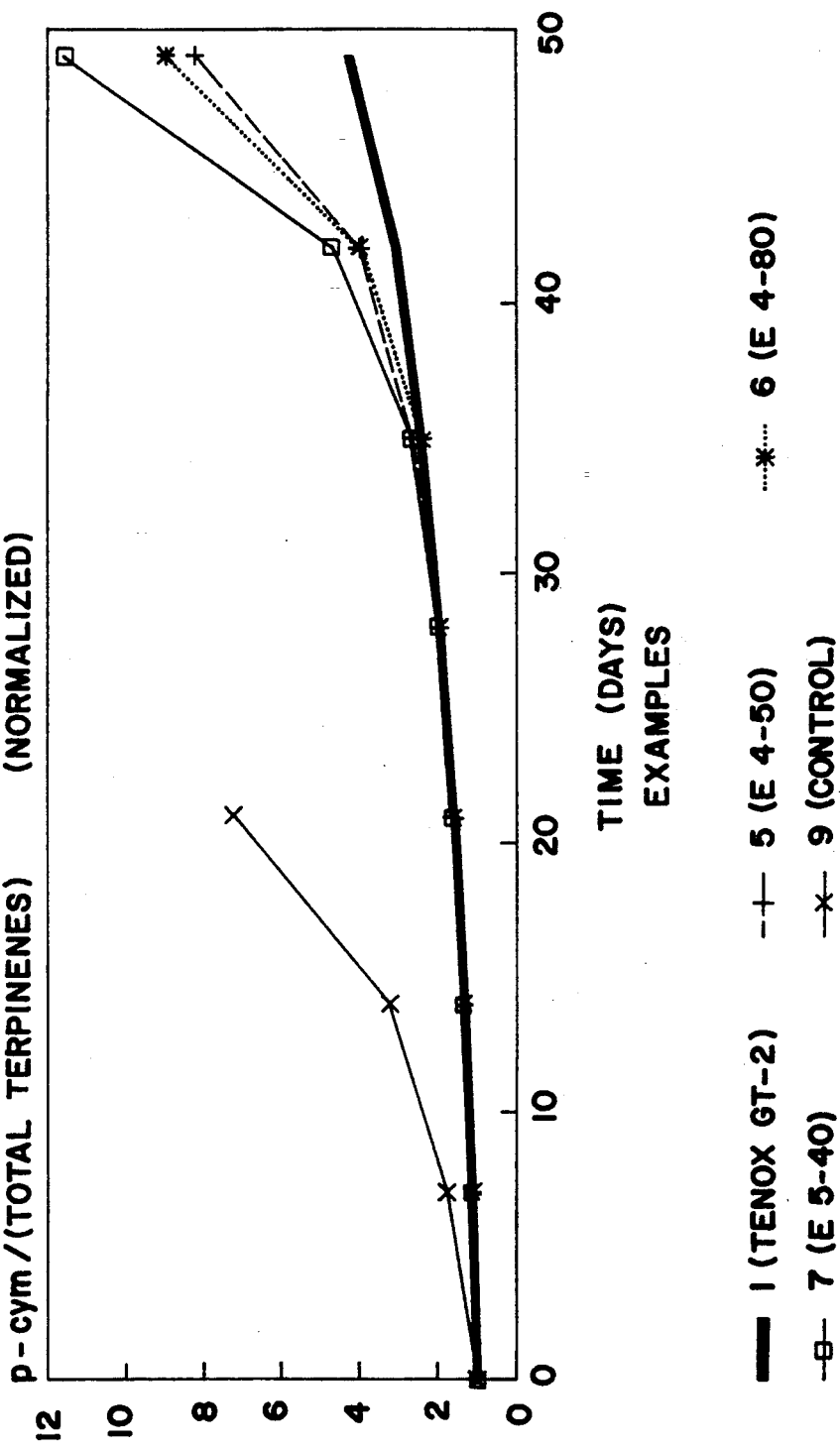
FIG. 2 shows oxidation as a function of time for peppermint oil samples which have been stabilized with Tenox GT-2 and with various vitamin E mixtures, and for an unstabilized sample.

FIG. 2 compares the Tenox GT-2 samples (Example 1) with three vitamin E products (Examples 5-7) which are tocopherol mixtures falling outside the ranges of the invention. The Tenox GT-2 useful in the invention showed significantly greater antioxidant activity than each of the vitamin E products. In fact, the vitamin E products performed no better, and as a group were worse, than the individual homologs of Examples 2-4 plotted in FIG. 1.

Figure 3:
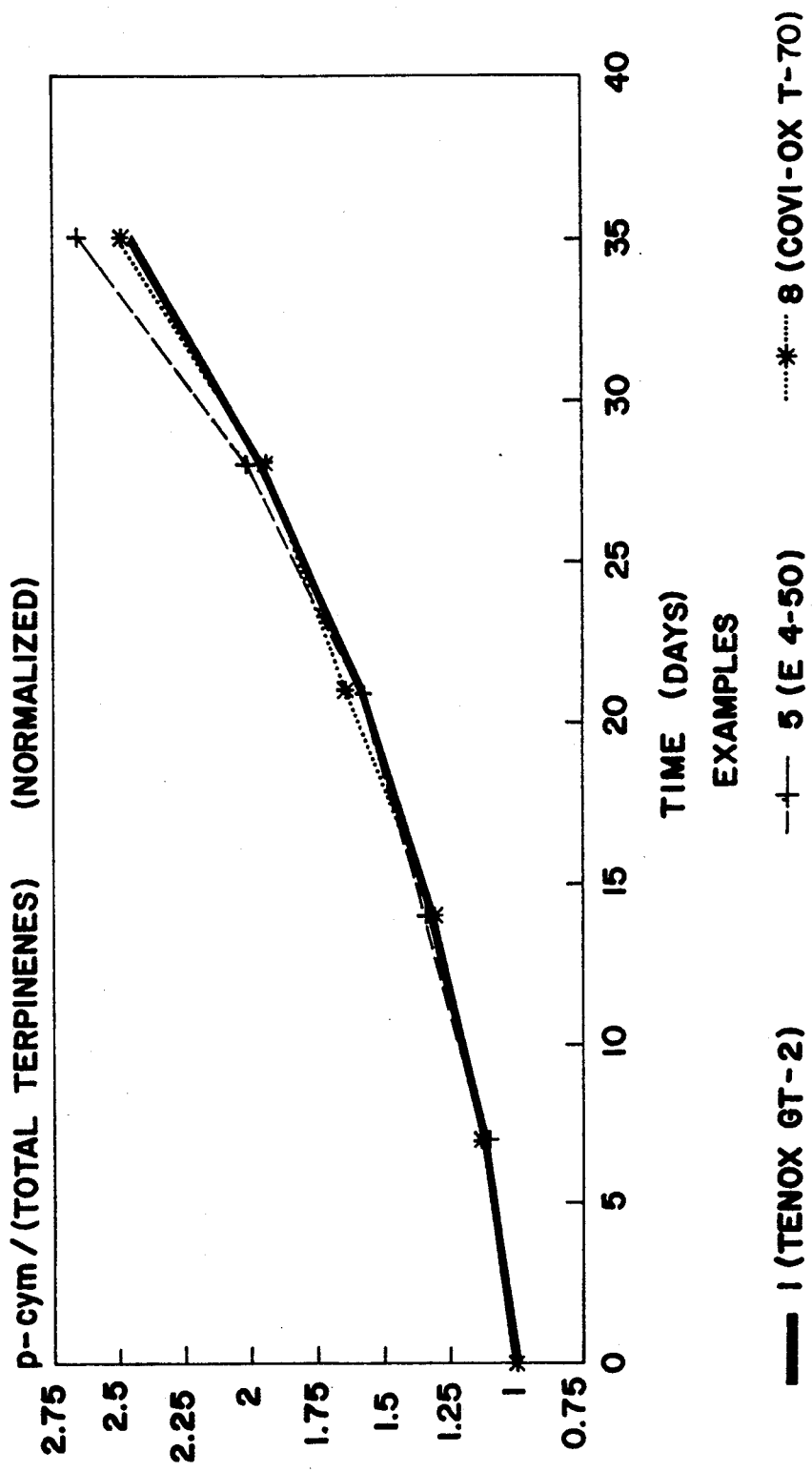
FIG. 3 shows oxidation as a function of time for peppermint oil samples which have been stabilized with Tenox GT-2, Covi-Ox T-70 and vitamin E. Covi-Ox T-70 is a commercially available tocopherol mixture containing 12% alpha tocopherol, 2% beta tocopherol, 30% delta tocopherol and 56% gamma tocopherol diluted with 30% vegetable oil.

FIG. 3 compares the Tenox GT-2 sample (Example 1) with the Covi-ox T-70 sample (Example 8) which is also useful in the invention. Both of the foregoing were compared with the vitamin E 4-50 sample (Example 5), for time periods of up to thirty-five days. The Tenox GT-2 and Covi-ox T-70 exhibited substantially identical antioxidant performance, and both outperformed the vitamin E 4-50 sample. This graph illustrates that the surprising and beneficial effects obtained with the invention are reproducible.

While the embodiments of the invention disclosed herein are at present considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. A stabilized peppermint oil composition, which comprises peppermint oil and 0.05-3% by weight of an antioxidant consisting essentially of 7-15% by weight alpha tocopherol, 45-70% by weight gamma tocopherol and 20-35% by weight delta tocopherol.

2. The stabilized peppermint oil composition of claim 1 in a chewing gum.

3. The stabilized peppermint oil composition of claim 2, comprising 0.07-2% by weight of the antioxidant.

4. A stabilized spearmint oil composition, which comprises spearmint oil and 0.05-3% by weight of an antioxidant consisting essentially of 7-15% by weight alpha tocopherol, 45-79% by weight gamma tocopherol and 20-35% by weight delta tocopherol.

5. The stabilized spearmint oil composition of claim 4 in a chewing gum.

6. The stabilized spearmint oil composition of claim 3 comprising 0.07-2% by weight of the antioxidant.

7. A stabilized mint oil composition, which comprises peppermint oil and spearmint oil and 0.05-3% by weight of an antioxidant consisting essentially of 7-15% by weight alpha tocopherol, 45-70% by weight gamma tocopherol and 20-35% by weight delta tocopherol.

8. A stabilized corn mint oil composition, which comprises corn mint oil and 0.05-3% by weight of an antioxidant consisting essentially of 7-15% by weight alpha tocopherol, 45-70% by weight gamma tocopherol and 20-35% by weight delta tocopherol.

9. The stabilized corn mint oil composition of claim 8 in a chewing gum.

10. A stabilized Scotch spearmint oil composition, which comprises Scotch spearmint oil and 0.05-3% by weight of an antioxidant consisting essentially of 7-15% by weight alpha tocopherol, 45-70% by weight gamma tocopherol and 20-35% by weight delta tocopherol.

11. The stabilized Scot spearmint oil of claim 10 in a chewing gum.

* * * * *

UNITED STATES PATENT AND TRADEMARK OFFICE
CERTIFICATE OF CORRECTION

PATENT NO. : 5,139,796

DATED : August 18, 1992

INVENTOR(S) : David G. Barkalow et al.

Page 1 of 2

It is certified that error appears in the above-indentified patent and that said Letters Patent is hereby corrected as shown below:

ON THE TITLE PAGE

In the Abstract, in the seventh line, delete "Homologue" and substitute --Homolog--; on line nine, delete "homologue" and substitute --homolog--.

Column 2, line 23, after "stabilizer" please insert --system for mint oils, especially peppermint oil, which--.

Column 2, lines 40-41, delete "Intention." and substitute --invention--.

Column 4, line 34, delete "such a" and substitute --such as--.

Column 6, line 22, delete "in. soluble" and substitute --insoluble--.

Column 8, line 41, delete "pine" and substitute --pint--.

UNITED STATES PATENT AND TRADEMARK OFFICE
CERTIFICATE OF CORRECTION

PATENT NO. : 5,139,796
DATED : August 18, 1992
INVENTOR(S) : David G. Barkalow et al.

It is certified that error appears in the above-indentified patent and that said Letters Patent is hereby corrected as shown below:

IN THE CLAIMS

Claim 4, line 4, delete "45-79%" and substitute --45-70%--.

Claim 11, line 1, delete "Scot" and substitute --Scotch--.

Signed and Sealed this

First Day of November, 1994

Attest:

BRUCE LEHMAN

Attesting Officer

Commissioner of Patents and Trademarks